Figure 1:
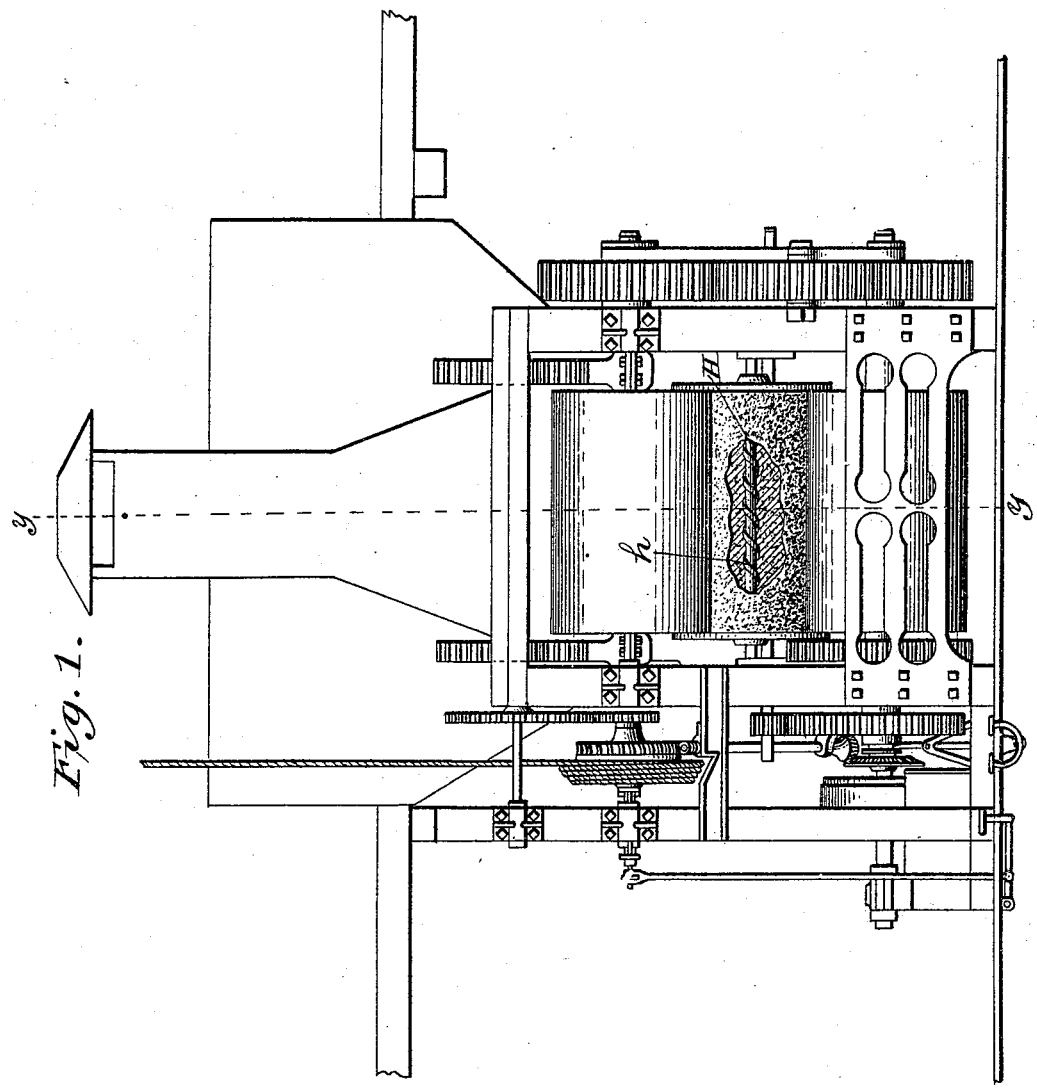

(No Model.) 3 Sheets—Sheet 1.

C. W. WHITE.
APPARATUS FOR REMOVING CORES FROM CYLINDRICAL COTTON BALES.

No. 552,458. Patented Dec. 31, 1895.

Witnesses.
Jas. H. Blackwood
Maurice J. Siorussa.

Inventor.
C. W. White,
by Whitman & Wilkinson
Attorneys (No Model.) 3 Sheets—Sheet 2.
C. W. WHITE.
APPARATUS FOR REMOVING CORES FROM CYLINDRICAL COTTON BALES.
No. 552,458. Patented Dec. 31, 1895.
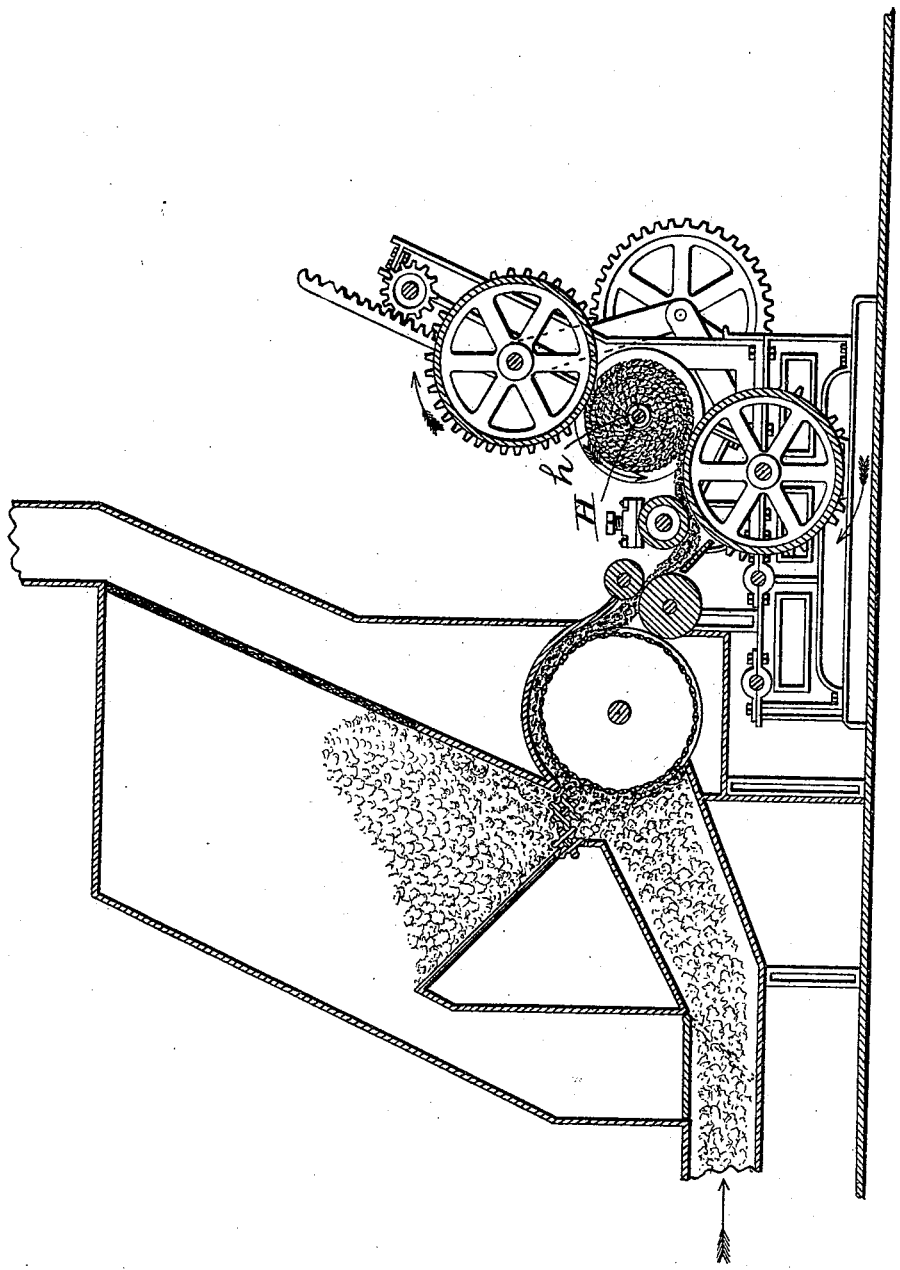
Witnesses:
Inventor.

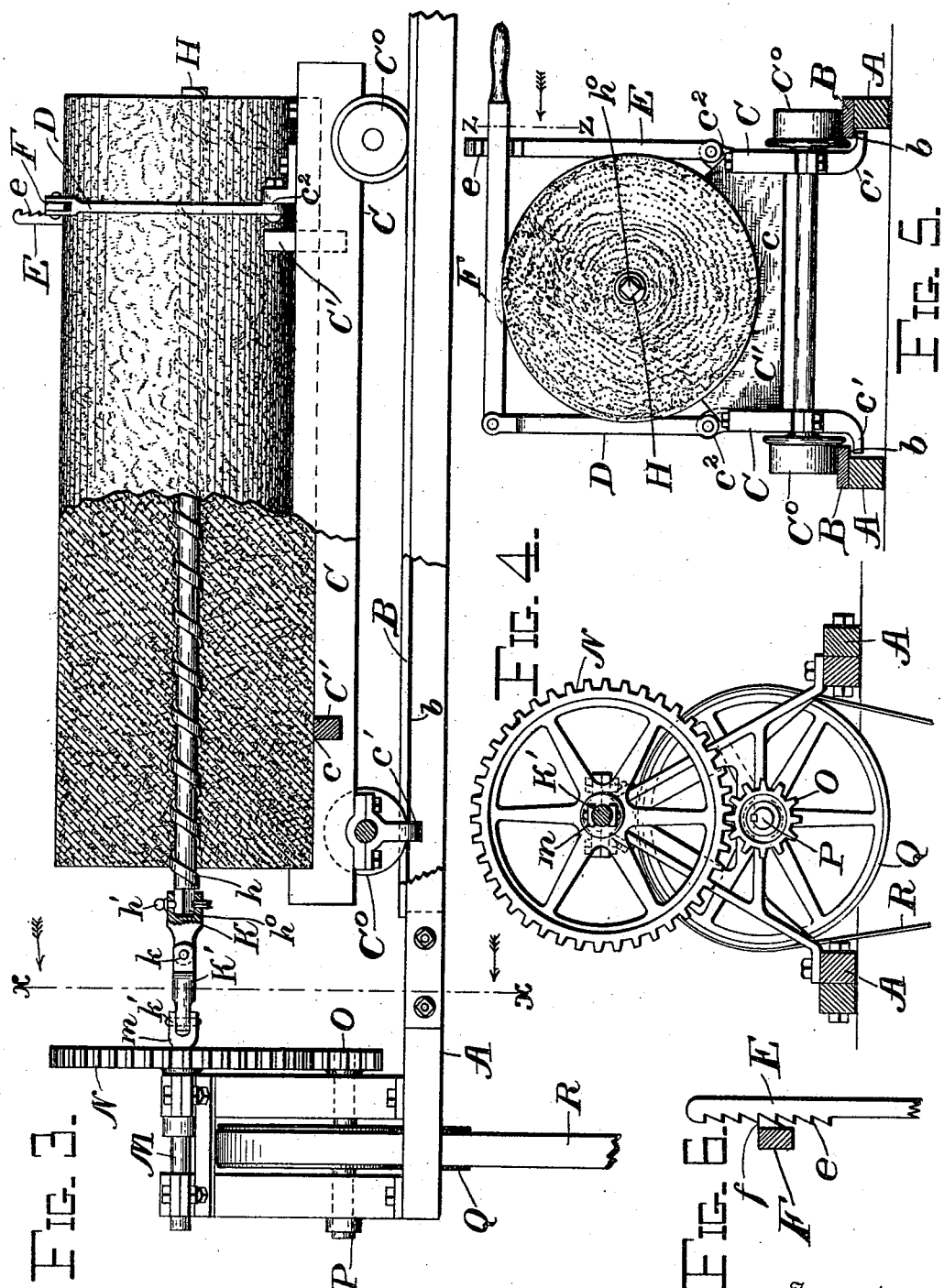

UNITED STATES PATENT OFFICE.

CHARLES W. WHITE, OF WACO, TEXAS, ASSIGNOR TO MARY J. WHITE, OF SAME PLACE.

APPARATUS FOR REMOVING CORES FROM CYLINDRICAL COTTON-BALES.

SPECIFICATION forming part of Letters Patent No. 552,458, dated December 31, 1895.

Application filed April 15, 1895. Serial No. 545,804. (No model.)

*To all whom it may concern:*

Be it known that I, CHARLES W. WHITE, a citizen of the United States, residing at Waco, in the county of McLennan and State of Texas, have invented certain new and useful Improvements in Means for Removing Cores from Cotton-Bales; and I do hereby declare the following to be a full, clear, and exact description of the invention, such as will enable others skilled in the art to which it appertains to make and use the same.

My invention relates to means for removing screw-threaded cores from cylindrical cotton-bales; and it consists of certain novel features hereinafter described and claimed.

Reference is had to the accompanying drawings, in which the same parts are indicated by the same letters throughout the several views.

Figure 1 represents an end view of the cotton-compress shown in Letters Patent No. 530,001, granted November 27, 1894, to Charles L. and William T. Bessonette and assigned to the Bessonette Cotton Manufacturing Company, of Waco, Texas, the said figure representing the bale broken away to show the screw-core. Fig. 2 represents a section along the line $y\ y$ of Fig. 1. Fig. 3 represents a side elevation, partly in section, showing the core in position in the bale, and illustrating the means of removing the said core from the bale. Fig. 4 represents a section along the line $x\ x$ of Fig. 3 and looking in the direction of the arrows. Fig. 5 represents an end view of the bale and the truck on which the same is secured while the core is being unscrewed; and Fig. 6 represents a detail view of the hand-lever and the teeth for engaging the same, being a section along the line $z\ z$ of Fig. 5.

The method by which the cotton is wound about the core, and the finished bale is removed from the compress, is clearly described in the Letters Patent No. 530,001 aforesaid, and therefore the description in this application will be confined to the method of removing the core from the finished bale.

Referring especially to Figs. 3 to 6, A represents a suitable framework on which are mounted the tracks B which project beyond the timbers on which they are mounted, as shown at $b$.

C represents the truck on which the bale is mounted, the said truck being provided with two or more shoes C' for supporting the bale, which shoes are cut away, as at $c$, to enable the bale to rest securely therein. The truck is mounted upon wheels $C^0$ running upon the tracks B, and is provided with dependent hooks or arms $c'$ which pass beneath the overhanging edges $b$ of the rails, and thus hold the truck on the track against any force tending to lift the same. The truck is also provided with pivot-plates $c^2$ to which the pivoted arms D and E are connected. The arm D has pivoted thereto the hand-lever F, which is provided with a pawl $f$ adapted to engage in one of the teeth $e$ of the pivoted arm E, as shown most clearly in Figs. 5 and 6.

In practice, the bale is put upon the truck, and is clamped against turning by pressing down hard on the hand-lever F and engaging the same by means of its pawl with the pivoted arm E. The bale is provided with a screw-threaded core H, the threads $h$ of which are preferably coarse and flat on top both to facilitate the process of winding up the bale and to prevent the screw-thread from cutting the fibers. The end of the core is made polygonal, preferably square, to engage the unscrewing mechanism. This mechanism consists of the member K pivoted at $k$ and provided with a rectangular opening into which the squared end of the core enters, and a second member K', which is pivoted to the fork $m$ on the end of the shaft M, as at $k'$. The pivots $k$ and $k'$ are at right angles to each other, and thus the two members K and K' form a universal joint which is vertically and laterally flexible, but which is secure against torsional strains.

The shaft M is rotated by the crown-wheel N, meshing in the pinion O, which is mounted on the same shaft P with the pulley Q, which is driven by the belt R from any suitable source of power.

The mechanism for rotating the shaft M may be varied at will.

The member K, as also the end of the core H, may be perforated to receive the cotter-pin $h'$, if desired, but this will not always be necessary.

In the operation of the device, the bale is clamped on the truck and is run forward into the position shown in Fig. 3, the squared end of the core being engaged in the corresponding recess in the member K. The cotter-pin is put in place, and the shaft M is caused to revolve in such a manner as to unscrew the core from the bale. As the core is unscrewed it will force the truck away from the member K, and the free end of the core will finally drop out of the bale, or it may be readily caught in any convenient manner, while the bale is wheeled off to be replaced by another bale from which the core has not been removed. The function of the cotter-pin is to prevent the inertia of the moving truck from moving the end of the core out of engagement with the member K, should the truck at any time move faster than the core is unscrewed. The cotter-pin would also hold one end of the core after the other end has become disengaged from the bale; but the said cotter-pin may be omitted from the machine, if desired. Thus it will be seen that the same cores may be used over and over again, while the bale as ready for shipment will be coreless, and the very objectionable feature of the core in the cylindrical bale, as now most commonly manufactured, will be avoided.

The obvious advantages of the herein-described construction will readily suggest themselves to any practical mind.

Having thus described my invention, what I claim, and desire to secure by Letters Patent of the United States, is—

1. An apparatus for removing screw threaded cores from cylindrical cotton bales, comprising a wheeled-truck, supporting the bale, a device for gripping the end of the core and means for revolving the said gripping device, substantially as and for the purposes described.

2. An apparatus for removing screw cores from cylindrical cotton bales which comprises a wheeled-truck, means for clamping the bale on said truck, a gripping device adapted to engage the end of the core, and means for rotating said gripping device, substantially as and for the purposes described.

3. An apparatus for removing screw threaded cores from cylindrical cotton bales, which comprises a wheeled-truck, and means for clamping the bale thereon, a driven shaft, and a universal joint connecting said driven shaft with the end of said core, substantially as and for the purposes described.

In testimony whereof I affix my signature in presence of two witnesses.

CHARLES W. WHITE.

Witnesses:
JOHN C. WILSON,
MAURICE J. SIOUSSA.